ns patent office
3,766,255
Patented Oct. 16, 1973

3,766,255
PROCESS FOR EXTRACTING SULFONIC ACIDS
Henry Shuttleworth, Pointe-a-Pierre, Trinidad, West Indies, assignor to Texaco Trinidad, Inc., Point-a-Pierre, Trinidad, West Indies
No Drawing. Filed Nov. 18, 1970, Ser. No. 90,790
Int. Cl. C07c 143/02
U.S. Cl. 260—513 R   2 Claims

ABSTRACT OF THE DISCLOSURE

Sulfonic acids in the product from a sulfoxidation reaction are separated from sulfuric acid by extracting with at least one organic solvent the heavy phase resulting from the process reaction. Suitable organic solvents include halogenated compounds such as carbon tetrachloride, chlorobenzene and ethylene dichloride. From 400 to 600% by volume of solvent is used, and room temperature is preferred.

BACKGROUND OF THE INVENTION

Field of the invention

This invention relates to a process for separating sulfonic acids from sulfuric acid with which they occur following a sulfoxidation process involving liquid hydrocarbons.

DESCRIPTION OF THE PRIOR ART

In commonly assigned co-pending application, Ser. No. 40,740, filed May 26, 1970, there is disclosed and claimed a process for producing sulfonic acids without irradiation by reacting in a reactor substantially straight chain saturated liquid hydrocarbons with oxygen and sulfur dioxide under substantially anhydrous conditions in the presence of a low molecular weight acyl oxide such as acetic anhydride at temperatures of about 25 to 55° C. under pressures of from 0 to 100 p.s.i.g. while agitating throughout the process these reactants followed by continuously removing the resulting heavy phase containing product and unreacted paraffins from the reactor.

The linear sulfonate product prepared by this process contains about 35 mole percent of sulfuric acid. Although this quantity of sulfuric acid is high, it has no detrimental effect in a finished detergent formulation containing such sulfonates, as the sodium sulfate formed from the sulfuric acid can be used as part of the "builders" in the detergent. Undesirably, however, it is not possible with this high a sulfuric acid content to obtain aqueous solutions of a neutral mixture at concentrations greater than 30% w./w. owing to the separation of sodium sulfate at room temperature. Thus it would be advantageous, with regards to increased facility in handling, improvement of minimum product value and appearance, if the sulfuric acid content could be reduced economically. Similarly, it would improve the economics of the process if the sulfuric acid could be made readily available for producing sulfur dioxide which could be used again in the sulfoxidation reaction.

SUMMARY OF THE INVENTION

In accordance with the invention, the heavy product phase from the sulfoxidation process is extracted with from 300 to 600% by volume of at least one organic solvent to remove the sulfonic acids present therein and leave behind sulfuric acid. Suitable organic solvents include halogenated compounds such as carbon tetrachloride, chlorobenzene, ethylene dichloride and mixtures thereof. The invention encompasses single and multiple contact extractions with single solvents and single contact extraction with double solvents.

DESCRIPTION OF THE INVENTION

A typical sample of the heavy product phase from the sulfoxidation process had the following characterization:

Density _____ 1,0275
Content, percent w./w.:
    Water _____ 3.0
    Paraffin _____ 7.1
    Sulfuric acid _____ 12.0
    Monosulfonic acid _____ 45.5
    Disulfonic acid _____ 32.4

CARBON NUMBER DISTRIBUTION, PERCENT W./W.

$C_{10}$ _____ 1.3
$C_{11}$ _____ 1.7
$C_{12}$ _____ 0.9
$C_{13}$ _____ 0.6
$C_{14}$ _____ 17.4
$C_{15}$ _____ 20.1
$C_{16}$ _____ 17.9
$C_{17}$ _____ 21.4
$C_{18}$ _____ 15.2
$C_{19}$ _____ 3.5
Heavier _____ Trace To determine how effectively sulfonic acids are recovered from the heavy phase product by solvent extraction, the aniline method of analysis which is relatively easy and quick and which gives a quantitative comparison between the sulfuric and sulfonic acids contents of the experimental samples, was found to serve adequately.

Analysis of two 5 parts by vol. samples of the heavy phase product by this method gives an average value for Sulfonic acid/sulfuric acid of 0.95 eq./eq.

(a) Single contact extractions with single solvents: Extractions were carried out batchwise. Small samples of heavy phase product and solvent were mixed thoroughly in a separating funnel and allowed to stand.

No phase separation was observed in mixtures of heavy phase product and any of the chosen solvents, carbon tetrachloride, trichloroethylene, chlorobenzene and ethylene dichloride, when the solvent dosage was less than 400% by volume of the heavy phase. At higher solvent dosages separation into two layers was observed. Comparative extractions were made with these solvents at dosages of 400% and 600%. In these extractions 5 parts by volume samples of heavy phase product were mixed separately with 20 parts by volume and 30 parts by volume samples of the four solvents. In each case, two phases were observed; a small very dark layer which is rich in sulfuric acid, and a lighter layer which contains most of the sulfonic acids and the solvent. The relative positions of these layers depend on the density of the solvent used. Analytical data for these extractions are given in Table 1. The figures given for the sulfonic acids concentration and recovery are calculated on the basis of the total acids (sulfuric and sulfonic) and disregard water, paraffin and solvent contents.

Chlorobenzene appears to give the best compromise for recovery and concentration of the sulfonic acids. Ethylene dichloride gives the best concentration but the recovery is somewhat lower than that of chlorobenzene.

(b) Triple contact extraction with a single solvent: Batchwise co-current triple contact extractions were carried out on 25 parts by volume samples of heavy phase product with the 4 solvents, with the aim of improving the sulfonic acids recovery over that obtained in the single contact extraction. In each extraction the heavy phase product was first contacted with 6 times its volume of solvent. In each of the next two contacting stages, the dark layer of the previous stage was contacted with 6 times its volume of fresh solvent. Thus, a final dark layer or raffinate phase, and 3 light layers or extract phases from the 3 contacting stages are obtained. The extract phases and chlorobenzene were also carried out and in the case with trichloroethylene mixtures with the DMSO at ½ and 1½ times its original volume were also examined. The results are summarized in Table 3.

TABLE 1.—SINGLE CONTACT EXTRACTION OF HEAVY PHASE PRODUCT WITH SINGLE SOLVENTS AT ROOM TEMPERATURE

| Solvent | Dark layer | | | Light layer | | | Potential recovery of $RSO_3H$, percent, eq./eq. |
|---|---|---|---|---|---|---|---|
| | Position | $RSO_3H/H_2SO_4$, percent, eq./eq. | $RSO_3H$ conc$^n$, percent, eq./eq. | Position | $RSO_3H/H_2SO_4$, percent, eq./eq. | $RSO_3H$ conc$^n$, percent, eq./eq. | |
| Solvent/heavy phase product, vol./vol.=6/1 | | | | | | | |
| Carbon tet | Top | 0.242 | 19 | Bottom | 2.89 | 74 | 74 |
| Trichloroethylene | Top | 0.123 | 11 | do | 2.06 | 67 | 89 |
| Chlorobenzene | Bottom | 0.108 | 10 | Top | 2.96 | 75 | 89 |
| Ethylene dichloride | do | 0.159 | 14 | Top | 7.00 | 88 | 80 |
| Solvent/heavy phase product, vol./vol.=4/1 | | | | | | | |
| Carbon tet | Top | 0.375 | 27 | Bottom | 1.82 | 65 | 79 |
| Trichloroethylene | Bottom | 0.194 | 16 | do | 1.72 | 63 | 86 |
| Chlorobenzene | do | 0.106 | 10 | do | 1.93 | 66 | 92 |
| Ethylene dichloride | do | 0.268 | 21 | Top | 3.02 | 75 | 76 |

NOTE.—$RSO_3H$ concentration calculated on basis of total acids.

TABLE 2.—TRIPLE CONTACT EXTRACTION OF HEAVY PHASE PRODUCT WITH SINGLE SOLVENTS AT ROOM TEMPERATURE, WITH SOLVENT DOSAGE OF 600% IN EACH STAGE

| Solvent | Volume, ml. | | | | Dark layer | | | Light layer | | | Potential recovery of $RSO_3H$, percent, eq./eq. |
|---|---|---|---|---|---|---|---|---|---|---|---|
| | Heavy phase | Solvent Stage 1 | Stage 2 | Stage 3 | Position | $RSO_3H/H_2SO_4$, percent, eq./eq. | $RSO_3H$ conc$^n$, percent, eq./eq. | Position | $RSO_3H/H_2SO_4$, percent, eq./eq. | $RSO_3H$ conc$^n$, percent, eq./eq. | |
| Carbon tet | 25 | 150 | 84 | 45 | Top | 0.094 | 9 | Bottom | 2.50 | 71 | 91 |
| Trichloroethylene | 25 | 150 | 45 | 35 | Top | 0.039 | 4 | do | 2.00 | 67 | 96 |
| Chlorobenzene | 25 | 150 | 39 | 33 | Bottom | 0.038 | 4 | Top | 2.88 | 74 | 95 |
| Ethylene dichloride | 25 | 150 | 46 | 40 | do | 0.046 | 4 | Top | 5.00 | 83 | 94 |

TABLE 3.—SINGLE CONTACT EXTRACTION OF HEAVY PHASE PRODUCT WITH DOUBLE SOLVENT AT ROOM TEMPERATURE

| Organic solvent | Mixture composition volume distribution | | | Dark layer | | | Light layer | | | Potential recovery of $RSO_3H$, percent, eq./eq. |
|---|---|---|---|---|---|---|---|---|---|---|
| | Heavy phase | DMSO | Org. solv. | Position | $RSO_3H/H_2SO_4$, percent, eq./eq. | $RSO_3H$ conc$^n$, percent, eq./eq. | Position | $RSO_3H/H_2SO_4$, percent, eq./eq. | $RSO_3H$ conc$^n$, percent, eq./eq. | |
| Trichloroethylene | 1 | 1 | 3 | Top | 0.103 | 9 | Bottom | 3.75 | 79 | 91 |
| Do | 1 | 1 | 6 | do | 0.092 | 8 | do | 4.44 | 82 | 89 |
| Do | 1 | ½ | 3 | do | 0.072 | 7 | do | 3.46 | 78 | 93 |
| Do | 1 | 1½ | 3 | do | 0.072 | 7 | do | 3.47 | 78 | 93 |
| Chlorobenzene | 1 | 1 | 3 | Bottom | 0.108 | 10 | Top | 3.73 | 79 | 90 |
| Do | 1 | 1 | 6 | do | 0.125 | 11 | do | 4.46 | 82 | 87 |
| Carbon tetrachloride | 1 | 1 | 3 | Top | 0.286 | 22 | Bottom | 3.64 | 78 | 67 | were bulked, and aliquots of the dark layer and the bulked light layers were analyzed by the aniline method. The results are given in Table 2.

Improved recovery of sulfonic acids was obtained in each case, but there was a slight decrease in concentration.

Triple contact extractions where the extract phase (light layer) from each contact stage was mixed with fresh solvent in the next stage at solvent dosages of 600% were also carried out with trichloroethylene and chlorobenzene. These gave a lower recovery and higher concentration of sulfonic acids than the single contact extractions.

(c) Single contact extraction with double solvents: Extraction of the heavy phase product with single solvent requires a very high solvent dosage (greater than 400%). Single contact extractions were carried out, where 10 parts heavy phase product, 10 parts by volume dimethylsulfoxide (DMSO) and 30 parts by volume chlorinated organic solvents were mixed together. The organic solvents used were trichloroethylene, chlorobenzene and carbon tetrachloride. Separation into two layers occurred in each case. The analytical results are shown in Table 3.

Mixtures where the organic solvents content was reduced to 10 ml. and lower showed little or no separation.

Extractions using higher dosages of trichloroethylene

What is claimed is:

1. Process for removing sulfonic acids from the product of a paraffin sulfoxidation reaction including a mixture of water, unreacted paraffins, and sulfuric acid which comprises extracting said product with 300 to 600% by volume of one of a chlorinated solvent selected from the group of chlorobenzene, ethylene dichloride, carbon tetrachloride and trichloorethylene admixed with dimethyl sulfoxide in the range of 3 to 6 parts of said chlorinated solvent to ½ to 1½ parts of dimethyl sulfoxide thereby forming a raffinate phase rich in sulfuric acid and an extract phase containing said sulfonic acid and solvent and separating said phases.

2. The process according to claim 1, wherein the amount of solvent used ranges from about 400 to about 600 volume percent of said mixture.

References Cited

UNITED STATES PATENTS 3,423,454   1/1969   Marrian _____ 260—513 R
3,454,479   7/1969   Hopkins et al. _____ 260—513 R
3,660,471   5/1972   Sawand et al. _____ 260—513 R DANIEL D. HORWITZ, Primary Examiner